US010514203B2

(12) United States Patent
Filippi et al.

(10) Patent No.: US 10,514,203 B2
(45) Date of Patent: Dec. 24, 2019

(54) PLANT AND PROCESS FOR AMMONIA PRODUCTION WITH CRYOGENIC PURIFICATION, AND RELATED METHOD OF REVAMPING

(71) Applicant: Casale SA, Lugano (CH)

(72) Inventors: Ermanno Filippi, Castagnola (CH); Raffaele Ostuni, Lugano (CH)

(73) Assignee: Casale SA (CH)

( * ) Notice: Subject to any disclaimer, the term of this patent is extended or adjusted under 35 U.S.C. 154(b) by 0 days.

(21) Appl. No.: 15/527,989

(22) PCT Filed: Nov. 25, 2015

(86) PCT No.: PCT/EP2015/077605
§ 371 (c)(1),
(2) Date: May 18, 2017

(87) PCT Pub. No.: WO2016/102136
PCT Pub. Date: Jun. 30, 2016

(65) Prior Publication Data
US 2018/0266758 A1  Sep. 20, 2018

(30) Foreign Application Priority Data
Dec. 23, 2014 (EP) .................................. 14199953

(51) Int. Cl.
*F25J 3/02* (2006.01)
*C01B 3/02* (2006.01)
(Continued)

(52) U.S. Cl.
CPC ............. *F25J 3/0276* (2013.01); *C01B 3/025* (2013.01); *C01B 3/501* (2013.01); *C01B 3/506* (2013.01);
(Continued)

(58) Field of Classification Search
CPC ........ F25J 3/0276; F25J 3/0219; F25J 3/0233; F25J 3/0252; F25J 2205/80;
(Continued)

(56) References Cited

U.S. PATENT DOCUMENTS 4,296,085 A * 10/1981 Banquy .................. C01B 3/025
252/373
4,479,925 A   10/1984 Shires et al.
(Continued)

FOREIGN PATENT DOCUMENTS

CN      102596808 A     7/2012
CN      102985367 A     3/2013
(Continued)

OTHER PUBLICATIONS

International Search Report issued in connection with PCT/EP2015/077605.
(Continued)

*Primary Examiner* — Anthony J Zimmer
(74) *Attorney, Agent, or Firm* — Akerman LLP

(57) ABSTRACT

Process for the synthesis of ammonia from a make-up gas containing hydrogen and nitrogen, said process comprising: generation of a synthesis gas (8) containing hydrogen and nitrogen in a molar ratio lower than 3, inside a front-end section (2); a first cryogenic purification, designed to remove nitrogen and raise said molar ratio; conversion of the synthesis gas into ammonia (13) inside a high-pressure synthesis loop (6), with extraction from said loop of a purge stream (14) containing hydrogen and inert gases; wherein at least a portion of said purge stream (14) undergoes a further purification in order to recover at least part of the hydrogen contained therein, obtaining at least one stream (15, 15a, 16, 18) containing recovered hydrogen which is recycled to the process.

9 Claims, 5 Drawing Sheets

(51) Int. Cl.
*C07C 1/04* (2006.01)
*C01B 3/50* (2006.01)
*C01B 3/56* (2006.01)
*C01C 1/04* (2006.01)

(52) U.S. Cl.
CPC .............. *C01B 3/56* (2013.01); *C01C 1/0476* (2013.01); *F25J 3/0219* (2013.01); *F25J 3/0233* (2013.01); *F25J 3/0252* (2013.01); *C01B 2203/043* (2013.01); *C01B 2203/0405* (2013.01); *C01B 2203/046* (2013.01); *C01B 2203/146* (2013.01); *F25J 2205/40* (2013.01); *F25J 2205/60* (2013.01); *F25J 2205/80* (2013.01); *F25J 2210/02* (2013.01); *F25J 2210/04* (2013.01); *F25J 2210/06* (2013.01); *F25J 2210/20* (2013.01); *F25J 2215/02* (2013.01); *F25J 2230/32* (2013.01); *F25J 2245/02* (2013.01); *Y02P 20/52* (2015.11)

(58) Field of Classification Search
CPC .. F25J 2205/40; F25J 2205/60; F25J 2210/02; F25J 2245/02; F25J 2210/06; F25J 2210/20; F25J 2215/02; F25J 2210/04; F25J 2230/32; C01B 3/506; C01B 3/56; C01B 3/501; C01B 3/025; C01B 2203/043; C01B 2203/0405; C01B 2203/046; C01B 2203/146; C01C 1/0476; Y02P 20/52
See application file for complete search history.

(56) References Cited

U.S. PATENT DOCUMENTS

| | | | | |
|---|---|---|---|---|
| 4,524,056 A | * | 6/1985 | Banquy | C01B 3/025 |
| | | | | 423/359 |
| 4,780,298 A | * | 10/1988 | Kowal | C01B 3/025 |
| | | | | 423/359 |
| 5,935,544 A | * | 8/1999 | Bhakta | C01B 3/025 |
| | | | | 423/359 |
| 2010/0051876 A1 | * | 3/2010 | Filippi | C01B 3/025 |
| | | | | 252/377 |
| 2011/0223090 A1 | * | 9/2011 | Filippi | C01B 3/025 |
| | | | | 423/360 |
| 2012/0070364 A1 | | 3/2012 | Malhotra et al. | |
| 2012/0207663 A1 | | 8/2012 | Iob | |
| 2013/0039835 A1 | | 2/2013 | Ostumi et al. | |

FOREIGN PATENT DOCUMENTS

| | | |
|---|---|---|
| EP | 0 236 037 A2 | 9/1987 |
| EP | 2 284 125 A1 | 2/2011 |
| RU | 2022927 C1 | 11/1994 |
| RU | 2314255 C2 | 1/2008 |
| RU | 2505482 A | 8/2012 |

OTHER PUBLICATIONS

International Preliminary Report on Patentability issued in connection with PCT/EP2015/077605.

* cited by examiner

PLANT AND PROCESS FOR AMMONIA PRODUCTION WITH CRYOGENIC PURIFICATION, AND RELATED METHOD OF REVAMPING

This application is a national phase of PCT/EP2015/077605, filed Nov. 25, 2015, and claims priority to EP 14199953.2, filed Dec. 23, 2014, the entire contents of both of which are hereby incorporated by reference.

FIELD OF APPLICATION

The invention relates to a plant and a process for the ammonia production comprising a stage for cryogenic purification of the synthesis gas. The invention also relates to a method for revamping ammonia plants with cryogenic purification.

PRIOR ART

The industrial production of ammonia involves the catalytic reaction of a synthesis gas ("make-up gas") comprising hydrogen and nitrogen in a molar ratio of 3:1 inside a high-pressure synthesis loop operating usually at about 80-300 bar.

The make-up gas is produced in a front-end section, upstream of the synthesis loop, by means of reforming of a hydrocarbon feedstock, for example natural gas.

A known technique for the ammonia production, described for example in U.S. Pat. No. 3,442,613, comprises two-stage reforming, i.e. primary and secondary reforming, the secondary reforming being carried out with air in excess, and subsequent cryogenic purification of the synthesis gas. Said cryogenic purification is performed at a temperature around −160° C. and has the purpose of condensing and removing the excess nitrogen and the inerts (mainly methane and argon) contained in the synthesis gas. The nitrogen and the inerts are typically collected in a waste stream and said waste stream is for example recycled as fuel for the burners of the primary reforming reactor, in order to make use of its methane content.

This technology is essentially based on the principle of carrying out the secondary reforming with excess air, and removing the resulting excess nitrogen (with respect to the desired hydrogen-related ratio) by means of cryogenic purification. Moreover the excess nitrogen facilitates removal of the inerts.

Typically the cryogenic purification is preceded by conversion of the carbon monoxide into CO2, removal of the CO2, optionally methanation, removal of water and ammonia, for example by means of molecular sieves.

Said technology has a number of well-established advantages and is used in many ammonia plants around the world; however, it still has a number of drawbacks and hence margins for improvement.

The cryogenic purification process, in the prior art, is based on the principle of self-cooling, i.e. cooling of the cryogenic purifier is provided by expansion of the gas itself. In greater detail, self-cooling is generally obtained by expansion of the gas fed to the purification unit and by expansion of the waste stream mentioned above. This creates a drawback consisting in the loss of pressure of the feed gas. Said loss in pressure increases the consumption level of the compressor used to raise the pressure of the gas purified in the synthesis loop.

Another limitation of the prior art is that the sole operational variable for controlling the cryogenic purification process is represented by the aforementioned expansion of the feed gas. The degree of said expansion is substantially determined by the excess nitrogen of the feed gas, i.e. by the quantity of nitrogen to be removed. The removal of the inerts occurs accordingly, but is not directly controlled. It follows that the prior art is not entirely effective as regards removal of the inerts. The separation of argon, in particular, is problematic owing to the low concentration of the argon and its condensation temperature which is close to that of nitrogen. In the prior art relating to the aforementioned plants, the argon separation rarely reaches a value of more than 50-60%.

Another disadvantage is given by the fact that a quantity of residual hydrogen, contained in the waste stream, is lost.

As mentioned above, there exist a considerable number of ammonia plants of the type described above, with secondary reforming using excess air and cryogenic purification, and therefore there is a great interest in methods for revamping said plants, especially in order to increase the capacity in terms of the quantity of ammonia produced.

The prior art, for revamping of these plants, has suggested hitherto increasing the air flow to the secondary reforming. In fact, the main feature of these plants consists in the secondary reforming with excess air, and consequently attempts to increase the capacity tend precisely to increase the air flow to the secondary reforming. However, these methods require costly modifications of the air compressor in order to increase its flowrate. Typically said air compressor is driven by a gas turbine, and in some cases it is also required to modify said turbine, resulting in further costs. Alternatively it is possible to install a second air compressor in parallel with the existing compressor, but this solution is also costly and not very attractive since it requires a new machine and associated space for its installation.

Another problem of the revamping measures is that the apparatuses of the plant are made to operate at their maximum capacity and in these conditions it has been noted that the performance for the inerts separation gets worse with respect to the rated conditions. For example in some installations it has been found that in a revamped plant the methane content in the purified gas (fed to the synthesis loop) may increase from an initial value of about 3,000 ppm to a substantially higher value such as 4,000-5,000 ppm. This has negative consequences on the synthesis section, resulting, in some cases, in the need to install an additional reactor or revamp or replace the synthesis gas compressor. In other words it has been noted that the cryogenic purification unit creates a considerable bottleneck in the plant.

A further drawback of the known method of revamping these plants is that a significant increase in the excess air generally requires adaptation of the apparatuses and/or introduces problems such as an increase in the pressure losses and/or increase in energy consumption.

As a result the above described methods of the prior art for revamping the ammonia plants are not entirely satisfactory and may be scarcely attractive from point of view of costs.

SUMMARY OF THE INVENTION

The invention aims to overcome the abovementioned problems and limitations of the prior art. In greater detail, the invention aims to provide a process for the ammonia production comprising a cryogenic purification step which, compared to the prior art, allows: smaller pressure loss of the feed gas, higher suction pressure of the synthesis gas compressor and lower consumption thereof, greater efficiency of hydrogen recovery and inert gases removal, reduced circulation of the inerts in the synthesis loop, smaller excess air requirement.

These objects are achieved by a process and plant for ammonia synthesis from a make-up gas containing hydrogen and nitrogen according to the claims.

In particular, the process according to the invention comprises the following steps:
generation of a synthesis gas containing hydrogen and nitrogen in a molar ratio lower than 3, inside a front-end section;
a first cryogenic purification of said synthesis gas, designed to remove nitrogen and raise the hydrogen/nitrogen molar ratio of said gas to a predetermined value;
compression of the purified synthesis gas up to a synthesis pressure;
conversion of the synthesis gas into ammonia inside a synthesis loop, with extraction of a purge stream containing hydrogen and inert gases from said loop;
a second purification of at least one portion of said purge stream, by means of a process suitable to recover at least part of the hydrogen contained therein, with the production of at least one stream containing recovered hydrogen and at least one waste stream;
recycling said at least one stream containing recovered hydrogen to said process, in order to increase the ammonia production.

Said synthesis gas from the front-end section contains an excess of nitrogen preferably equal to at least 25% compared to the hydrogen/nitrogen molar stoichiometric ratio of 3, more preferably at least 35% and even more preferably at least 45%.

In a preferred embodiment, said synthesis gas produced by the front-end section contains no carbon oxides. Preferably the content of carbon oxides of said synthesis gas is at ppm level, more preferably <10 ppm. A synthesis gas containing no carbon oxides can be obtained with a step of methanation. For example a suitable process of generation of the synthesis gas in the front-end section includes: reforming of a hydrocarbon, shift conversion, removal of carbon dioxide and methanation.

Said second purification is performed inside a purge gas recovery unit, abbreviated below as PGRU. The waste stream may undergo the second purification step entirely or only partly. Preferably, at least 50% of the purge stream undergoes said second purification step, more preferably at least 70%.

Preferably, said second purification of the purge stream extracted from the synthesis loop comprises at least one process chosen from: cryogenic separation, which makes use of the different volatility of the components of the purge stream, for example the light components such as hydrogen and heavy components such as methane; permeation through membranes permeable to hydrogen and impermeable to inert gases; adsorption through adsorbent materials having high affinity for nitrogen and inert gases and low affinity for hydrogen. Said adsorbent materials operate preferably by means of pressure swing adsorption (PSA).

Said processes are known per se and do not need to be described in detail, but only by way of example. Each of these processes may require, in addition to units for separating the hydrogen-containing stream from the waste stream, specific units for pre-treatment of the purge stream. Said pre-treatment units comprise for example water washing columns, molecular sieves, cooling or heating exchangers and condensation separators. Said pre-treatment units, known per se, will not be described in detail.

In some embodiments, said second purification is performed by means of a multi-stage process of cryogenic separation and/or permeation through membrane, comprising a plurality of stages operating at different pressures.

With a multi-stage process, typically the stages are arranged in cascade, from a first higher-pressure stage to a last lower-pressure stage. In this way purification may result in the formation of streams which contain hydrogen recovered at different pressures, and which may be recycled in different stages of the process, i.e. at different points of the plant.

In particular, with a multi-stage process, at least one of said streams containing recovered hydrogen may be recycled to a point of the plant having a pressure higher than the inlet to the first cryogenic purification, preferably to the intake of one of the stages following the first stage for compression of the synthesis gas. Alternatively, at least one of said streams containing recovered hydrogen may be compressed inside a dedicated compressor.

Purification of the purge stream by means of cryogenic separation may be carried out inside a cryogenic PGRU, comprising essentially a cold-box containing at least one multi-passage heat exchanger and a gas-liquid separator. The PGRU may contain a device designed to perform the necessary self-cooling, said device being for example a turbine or an expansion valve for the incoming gas, more preferably for at least one of the output streams and even more preferably for the output waste stream.

The unit termed cold-box typically comprises at least one gas-liquid separator, for example a cryogenic distillation column (plate or filling type) or a film column. If nitrogen at a cryogenic temperature, for example liquid nitrogen, (or other cooling fluid suitable for the operating temperatures of cryogenic purification) is available, it may be heated and/or evaporated in a passage of a heat exchanger for cooling the PGRU, or combined with one of the streams of the PGRU (for example waste stream), cooling it.

Even more advantageously, in order to obtain a multi-stage purification, the cryogenic PGRU comprises a plurality of gas-liquid separators arranged in cascade, which ensure greater separation efficiency and minimum losses in the hydrogen recovery process. The first separator operates at a pressure higher than the following separators, which receive the liquid exiting the preceding separator.

According to one embodiment of the invention, said stream containing recovered hydrogen, or at least one of the streams containing recovered hydrogen and obtained from the second purification, is recycled directly to the synthesis stage after suitable compression. Compression of the stream containing recovered hydrogen may be performed separately from that of the product of the main purification, but preferably the two streams are compressed together inside the same machine.

According to another embodiment of the invention, at least one stream containing recovered hydrogen, obtained from the purification of the purge stream, is combined with the synthesis gas stream produced by the front-end section and consequently undergoes the first cryogenic purification step. In this case the flowrate of the gas to be treated in the first cryogenic purification, in particular the quantity of nitrogen and inerts (argon and methane) decreases. Consequently, the duty of the first cryogenic purification decreases. In other words, it may be said that the recovery unit PGRU operates as a pre-purifier of the synthesis gas and reduces the gas flowrate to be subjected to the aforementioned first cryogenic purification. If the gas obtained from the second purification does not contain water nor traces of ammonia, it may be sent directly to the first cryogenic purification, thereby also debottlenecking the dryer, as well as cryogenic purification.

In another embodiment, a portion of the synthesis gas exiting the front-end section undergoes directly said second purification, together with the purge stream extracted from the synthesis loop, said second purification step being of the cryogenic type. The advantage of this variant is a reduction in the gas flowrate to be subjected to the first cryogenic purification process inside the cold-box, as well as a reduction of the excess air and the energy consumption for compression of the gas to the pressure level of the synthesis loop. As a result of this measure, the PGRU substantially operates in parallel with the first cryogenic unit (main cryogenic unit), reducing the load thereof. The gas obtained from the front-end section and directed towards the second purification is removed for example upstream or downstream of the dryer. If the dryer has a sufficient capacity to treat the entire gas flow from the front-end section, it is advantageous to remove a portion of gas downstream of the said dryer, for sending to the second purification section. If, instead, the gas is removed upstream of the dryer, a second dryer is advantageously provided before the second purification.

Advantageously, said gas portion is supplied to a phase separator of the PGRU having a pressure close to the minimum operating pressure among: the inlet of the first cryogenic purification, the outlet of the first cryogenic purification, the inlet of the first compression stage of the compression section designed to raise the synthesis gas to the pressure of the loop.

In some embodiments at least a portion of the waste stream originating from purification of the purge stream is combined with the synthesis gas stream produced by the front-end section, before the first purification, i.e. upstream of the main cryogenic unit. This ensures a greater hydrogen recovery, because also the residual fraction of hydrogen in the waste stream, which is small but not entirely negligible, is at least partly recovered; at the same time the inerts accumulation is avoided, the main cold-box is not overloaded and nitrogen useful for self-cooling is not lost. The remaining portion of said waste stream is used, for example, as fuel in the front-end section.

The invention also relates to a method for revamping ammonia plants containing a cryogenic purification unit.

In particular, an ammonia plant comprising:
a front-end section which generates a synthesis gas containing hydrogen and nitrogen in a molar ratio lower than 3; a cryogenic purification section which removes nitrogen from the synthesis gas in order to raise the aforementioned molar ratio to a predetermined value; a compression section which raises the synthesis gas to a predefined synthesis pressure; a synthesis loop operating at said synthesis pressure, which produces a stream of ammonia and a purge stream containing hydrogen and inert gases,
is revamped by means of:
the addition of a recovery unit designed to separate hydrogen and fed with at least a portion of the purge stream from the synthesis loop; wherein said recovery unit generates one or more streams containing recovered hydrogen and a waste stream containing inert gases, and said inert gases typically comprise unreacted nitrogen, argon and/or methane;
the installation of a line for recycling to the plant said stream containing recovered hydrogen or at least one of said streams containing recovered hydrogen.

The preferred embodiments which have been described above are applicable also to the revamping method of the invention.

In particular some preferred revamping methods according to the invention are as follows.

Preferably the revamping method is applied to a plant in which said synthesis gas from the front-end section contains an excess of nitrogen equal to at least 25% compared to the hydrogen/nitrogen molar stoichiometric ratio of 3, more preferably at least 35% and even more preferably at least 45%.

Preferably, in the revamping method, at least 50%, even more preferably at least 70%, of said purge stream is fed to said newly installed recovery unit.

Advantageously, said newly installed recovery unit comprises at least one of the following: a cryogenic separation unit, a membrane permeable to hydrogen and impermeable to inert gases, an adsorbent bed made of a material having high affinity for inert gases and low hydrogen affinity, and wherein said newly installed recovery unit comprises a single stage or a plurality of stages operating at different pressures.

In a preferred embodiment, at least one of said streams containing recovered hydrogen is sent directly to the synthesis loop by means of the said compression section.

In a preferred embodiment, at least one stream containing recovered hydrogen, obtained from said newly installed recovery unit, is recycled upstream of the first cryogenic purification section.

In a preferred embodiment, said recovery unit comprises a cryogenic separation unit and at least one portion of the synthesis gas from the front-end section is redirected to said recovery unit.

In a preferred embodiment, said newly installed cryogenic recovery unit comprises at least one stage operating at a pressure close to or higher than the minimum pressure among the incoming stream of the first purification, the outgoing stream of the first purification and the intake of the first stage of the compression section, and said at least one portion of the synthesis gas is fed to said stage.

In another preferred embodiment, at least a portion of said waste stream produced by said recovery unit is recycled upstream of the first cryogenic purification section.

The new hydrogen recovery unit may operate with several stages, supplying streams containing recovered hydrogen at different pressures, and the revamping method may comprise the recycling of said streams to different points of the plant. The stream or streams containing recovered hydrogen may be recycled directly into the synthesis loop and/or into other parts of the plant, for example upstream of the existing cryogenic section. The direct recycling to the loop of a stream from the new recovery unit may be performed by feeding said stream to the intake of one of the stages of the gas compression section.

In some embodiments, where the new recovery unit is of the cryogenic type, the revamping method envisages deviating a portion of the synthesis gas from the front-end section, sending it directly to said new recovery unit. This measure reduces the load of the existing unit and is advantageous for increasing the capacity of the plant. If the dryer of the plant has a sufficient capacity to treat the entire gas flow from the front-end section, it is advantageous to remove a portion of gas downstream of the said dryer, for sending to the second purification section.

The main advantages of the invention are as follows.

A first advantage consists in the possibility of making control of the hydrogen/nitrogen molar ratio independent from control of the concentration of the inerts in the synthesis gas from the front-end section. In fact, the molar ratio is controlled by the main cryogenic unit, while removal of the inerts is also determined by the PGRU.

Moreover, the installation of a unit adapted to recover at least one stream containing hydrogen downstream of the main cryogenic unit allows a reduction in the synthesis gas flow to be treated in said unit, with the advantages of reduction in the flooding of the cryogenic distillation column, reduction of the pressure losses in the exchangers, reduction of the duty of the exchangers and consequently smaller work required by the expander, lower load of the molecular sieves upstream of said unit, and the possibility of reducing the excess nitrogen.

A further advantage consists in that a part of the nitrogen is separated in the PGRU and consequently the quantity of nitrogen to be separated in the main cryogenic unit (cold-box) is less. This results in a lower overhead temperature inside the distillation column of said cold-box and a lower reflux. It should also be noted that the processes of the prior art require a high temperature difference in the overhead condenser of the column, in order to obtain adequate separation of the excess nitrogen as well as the inert gases. Such a high temperature difference is not necessary in the process according to the invention, owing to the further removal step nitrogen and inerts.

Another advantageous feature of the invention is the possibility of reducing to a minimum the quantity of hydrogen lost in the waste gas. In particular with a multi-stage recovery unit, the recovery of hydrogen for each passage is of the order of 85-97% and overall a hydrogen recovery of more than 98-99% is obtained.

Another advantage is the fact that at least part of the gas containing hydrogen may be recovered and made available at a pressure higher than the intake pressure of the section for compression of the gas feeding the synthesis loop. Consequently, the working load of the respective compressor is reduced and in some cases it is possible to reduce the number of revolutions of said compressor. For example, if the PGRU separates one or more hydrogen-enriched streams at a pressure compatible with the intake of one of the intermediate stages of the section for compression of the synthesis gas, it is possible to considerably increase the flow of the purge stream without affecting the consumption of the compression section, thereby obtaining effective removal of the inerts.

The advantages of the invention which have been described are likewise obtained with revamping of an existing plant.

With the aforementioned revamping method a synergy between the first cryogenic purification section and the second purification section is created.

In particular, the first cryogenic separation section removes the excess nitrogen contained in the synthesis gas supplied from the front-end section, such as to provide a gas with a predefined hydrogen/nitrogen molar ratio, preferably of 3, to be introduced into the synthesis loop.

The inert gases (argon, methane and unreacted nitrogen) inside the PGRU may instead be easily and advantageously eliminated owing to their greater concentration in the purge stream compared to the make-up gas. Moreover, the permeation and adsorption mechanisms are also efficient in removing the inerts from the purge stream in the recovery unit.

These and other advantages will become even clearer with reference to the following detailed description.

DETAILED DESCRIPTION

Figure 1:
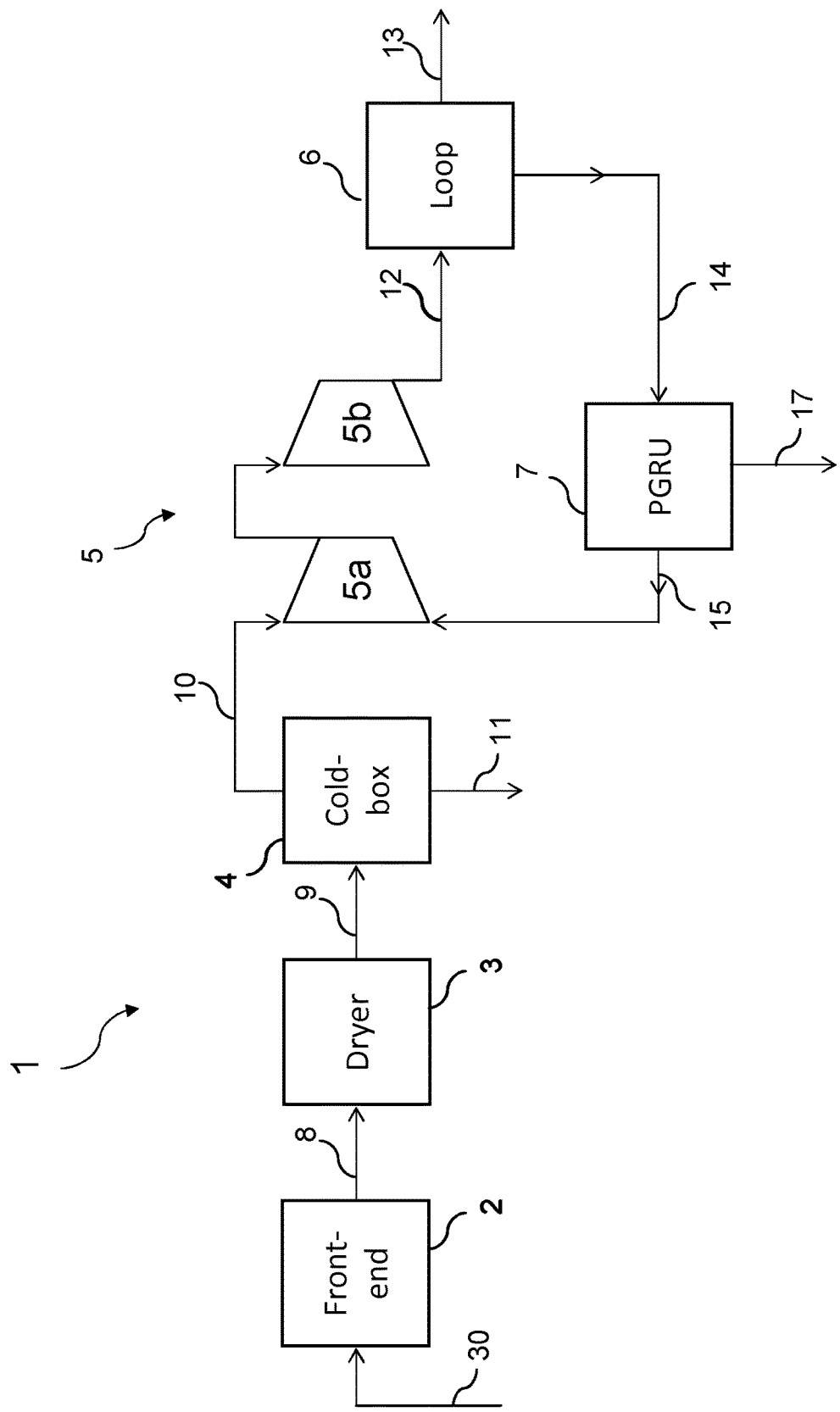
FIG. 1 shows a block diagram of an ammonia plant, according to an embodiment of the invention.

FIG. 1 shows a first embodiment of the invention in which a plant for ammonia synthesis, overall denoted by the reference number 1, comprises a front-end section 2 fed by a hydrocarbon source 30 (for example natural gas); a dryer 3; a cryogenic separation unit 4; a compression section 5; a synthesis loop 6; a hydrogen recovery unit 7.

The cryogenic unit 4 is also called "cold-box" in short. The unit 7 processes a purge stream 14 extracted from the synthesis loop 6 and for this reason is also called PGRU (Purge Gas Recovery Unit).

The front-end section 2 produces a synthesis gas 8 containing hydrogen and nitrogen in a molar ratio lower than 3, and preferably less than or equal to 2.5. In other words said synthesis gas 8 contains a certain excess of nitrogen due, for example, to excess air during a secondary reforming step. The gas 8 typically contains inert gases (mainly methane and argon) and water; moreover it may contain small quantities of ammonia.

The gas 8 is fed to the dryer 3, consisting for example of molecular sieves, for removal of the water and any ammonia, obtaining a substantially anhydrous stream 9.

Said stream 9 is introduced into the cryogenic separation unit 4. In said unit 4, the stream 9 is subjected to treatment in a cryogenic column, typically with overhead reflux, with elimination of at least part of the excess nitrogen and at least part of the inert gases. The cryogenic unit 4 produces a stream of purified synthesis gas 10 and a waste stream 11.

Preferably the stream 9 admitted into the cryogenic unit 4 contains no carbon oxides. This can be achieved preferably with a methanator in the front-end section 2. For example the front-end section 2 includes a purification section featuring a shift converter, a $CO_2$ removal unit and a methanator.

Said stream of purified synthesis gas 10 has a hydrogen/nitrogen molar ratio greater than that of the stream 8, i.e. closer to the objective value of 3. Preferably the hydrogen/nitrogen ratio of the stream 10 is substantially equal to 3, i.e. all the excess nitrogen contained in the stream 8 is removed by the cryogenic purification inside the unit 4. In this way the purified stream 10 has a composition suitable for feeding the synthesis loop 6. Moreover, it should be noted that the purified stream 10 has a pressure lower than the incoming stream 9, since an expansion necessary for maintaining the self-cooling occurs in the unit 4.

The waste stream 11 has a certain methane content and may be reused as fuel. For example, said stream 11 may be sent to the burners of a primary reformer of the front-end section 2.

The purified stream 10 is fed to the synthesis loop 6 via the compression section 5. The compression section 5 typically comprises a plurality of compression stages, in the example shown in FIG. 1 two stages 5a and 5b are shown. The pressure of the stream 12 feeding the synthesis loop 6 is for example equal to 150 bar.

The synthesis loop 6 produces a flow 13 of ammonia and the purge stream 14 containing unreacted hydrogen and nitrogen, in addition to argon and methane.

Said stream 14 is extracted from the loop 6 in order to avoid accumulation of the inert gases and is fed to the hydrogen recovery unit 7 (PGRU), obtaining at least one stream 15 containing recovered hydrogen, and a waste stream 17.

The stream 15 is recycled to the synthesis loop 6, being fed to a suitable stage of the compression section 5, for example to the first stage 5a.

The waste stream 17 typically comprises nitrogen, argon and methane, and may be used as fuel, in a similar manner to the stream 11.

Figure 2:
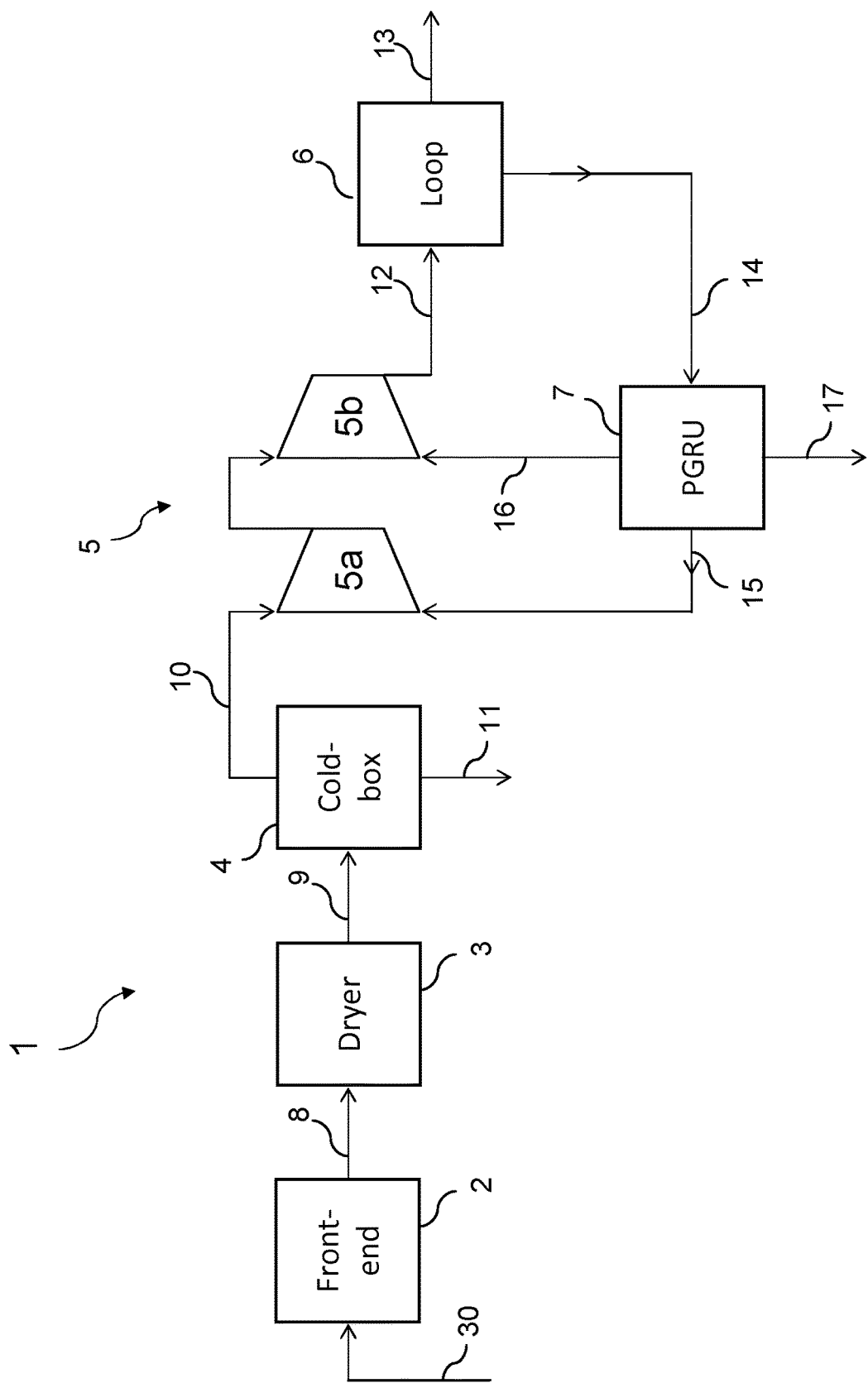
FIGS. 2-5 show a number of variants of the plant according to FIG. 1.

FIG. 2 shows a variant of the plant shown in FIG. 1, where the recovery unit 7 produces streams containing hydrogen at different pressures, which may be fed to different stages of the compression section 5. For example, the figure shows two streams containing recovered hydrogen, a stream 15 which is recycled to the first stage 5a and combined with the stream 10, and a stream 16 having a pressure greater than the stream 15, in turn recycled to the second stage 5b. The PGRU is for example of the cryogenic or membrane type.

Figure 3:
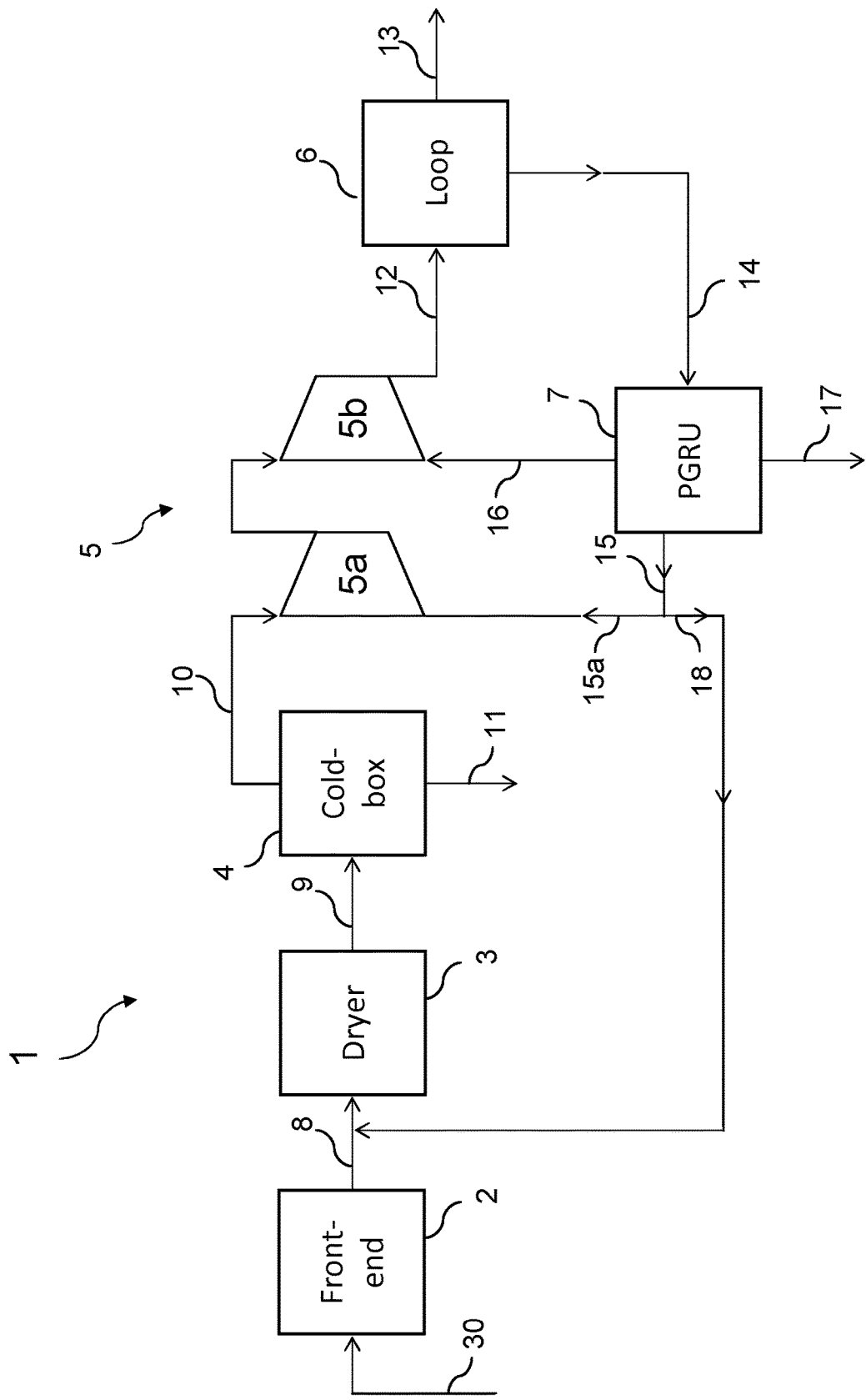

FIG. 3 shows a variant of the plant shown in FIG. 2, where a portion 18 of the stream 15 from the PGRU 7 is recycled upstream of the cold-box 4, for example to the inlet of the dryer 3 and combined with the stream 8 from the front-end section 2. In this case the PGRU 7 operates substantially as a pre-purifier of the synthesis gas 8 since it adds hydrogen. The remaining portion 15a of the stream 15 is fed to the compression section 5.

Figure 4:
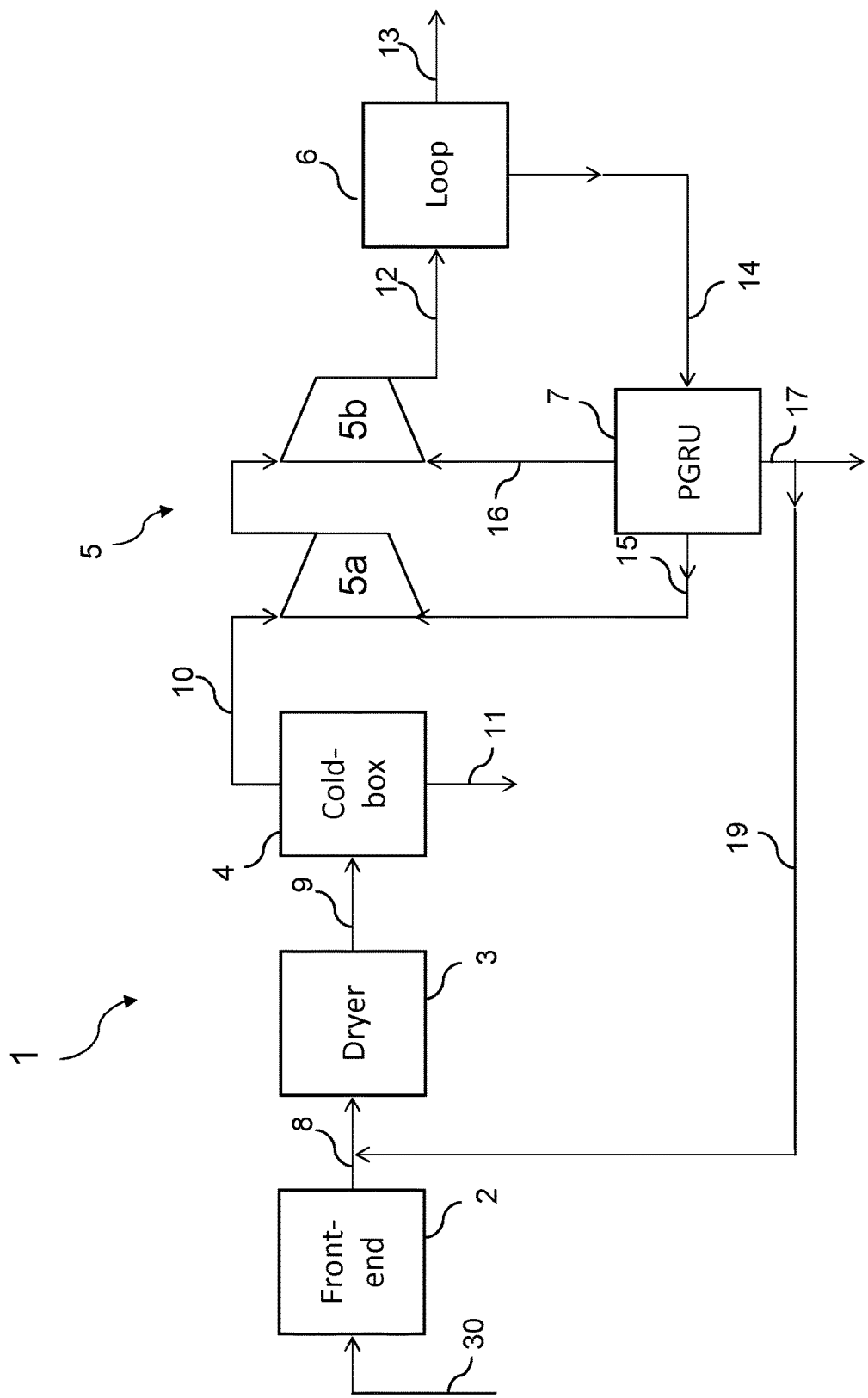

FIG. 4 shows a further variant of the invention in which a portion 19 of the waste stream 17 from the PGRU is recycled upstream of the cold-box 4, for example to the inlet of the dryer 3, being also combined with the stream 8 from the front-end section 2. This variant also allows recovery of at least part of the residual hydrogen contained in the waste stream 17.

The PGRU 7 may be a cryogenic unit or may operate using a different principle, for example membranes or adsorbent beds operating by means of pressure swing. In particular, the PGRU of the membrane type is the most suitable for realizing the variant according to FIG. 4, since the waste stream 17 is restored to a pressure such as it does not require re-compression in order to be recycled upstream of the first purification.

Figure 5:
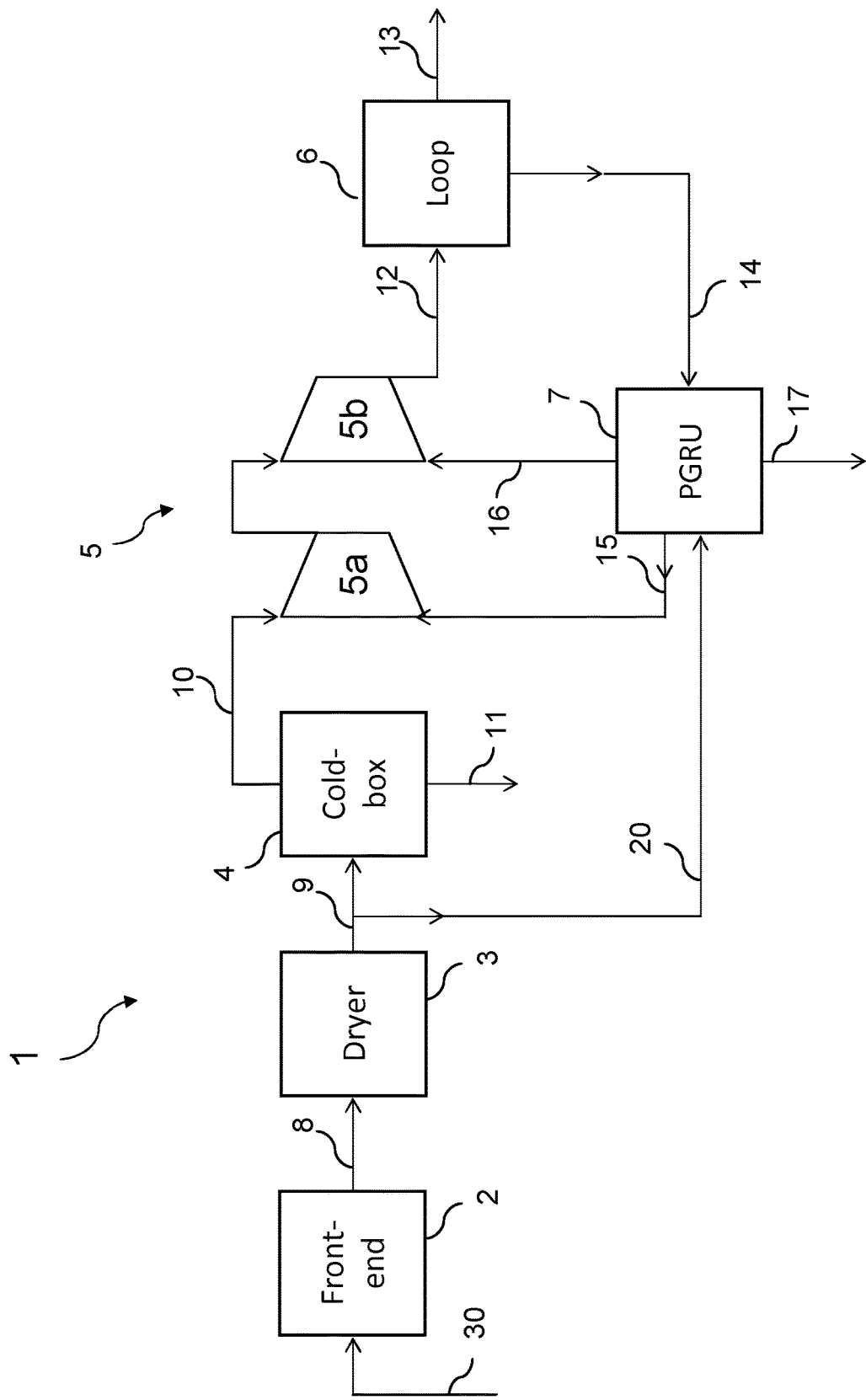

FIG. 5 shows an embodiment of the invention where said unit 7 is a multi-stage cryogenic separation unit. In this case, preferably, a portion 20 of the synthesis gas 9 from the dryer 3 is fed to said cryogenic unit 7. Consequently, the incoming flow of the cold-box 4 decreases, i.e. essentially the PGRU 7 cooperates with the cold-box 4 and reduces its working load.

The PGRU 7 comprises various stages in cascade operating at different pressures. More preferably, said portion 20 is fed to the stage of the PGRU 7 with the lowest pressure, for example to a stage with a pressure equal to or higher than the minimum pressure among: the inlet of the first purification unit 4, the outlet of the first purification unit 4, or the intake of the first stage 5a for compression of the synthesis gas.

A revamping method according to the invention essentially provides the addition of the PGRU 7. The method is applied to a plant which typically comprises the front-end section 2, the dryer 3, the cryogenic separation unit 4, the compression section 5 and the synthesis loop 6. The recovery unit 7, according to the revamping method of the invention, is added so as to recover at least part of the hydrogen contained in the purge stream 14 extracted from the loop 6. Said unit 7 may be connected to the rest of the plant for example using one of the configurations shown in FIGS. 1-5 and may require the installation of purge pre-treatment units, such as washing columns, dryers, exchangers and separators.

The invention claimed is:

1. A process for the synthesis of ammonia from a make-up gas containing hydrogen and nitrogen, said process comprising the steps of:
   production of a synthesis gas containing hydrogen and nitrogen in a molar ratio lower than 3, inside a front-end section;
   a first cryogenic purification of said synthesis gas, suitable to remove nitrogen and raise the hydrogen/nitrogen molar ratio of said gas to a predetermined value;
   compression of the purified synthesis gas to a synthesis pressure;
   conversion of synthesis gas into ammonia inside a synthesis loop, with extraction from said loop of a purge stream containing hydrogen and inert gases; and
   performing a second purification of at least one portion of said purge stream, by means of a process suitable to recover at least part of the hydrogen contained therein, with the production of at least one stream containing recovered hydrogen and of at least one waste stream,
   recycling said at least one stream containing recovered hydrogen to said process, in order to increase the ammonia production,
   wherein at least a part of said at least one stream containing recovered hydrogen is recycled by means of joining with the gas stream undergoing said first cryogenic purification step.

2. The process according to claim 1, wherein said synthesis gas from the front-end section contains an excess of nitrogen of at least 25% with respect to the hydrogen/nitrogen molar stoichiometric ratio of 3.

3. The process according to claim 1, wherein at least 50% of said purge stream undergoes said second purification.

4. The process according to claim 1, wherein said second purification comprises at least one of the following: a cryogenic separation process; a permeation process through a membrane permeable to hydrogen and impermeable to said inert gases; a process of adsorption with a material having high affinity for said inert gases and low affinity for hydrogen.

5. The process according to claim 4, wherein said second purification is performed by means of a multi-stage process involving cryogenic separation or permeation through membrane, the process comprising, respectively, a plurality of cryogenic or permeation separation stages operating at different pressures, and resulting in a plurality of streams containing recovered hydrogen at pressures different from each other.

6. The process according to claim 1, wherein a part of said at least one stream containing recovered hydrogen is recycled by means of direct feeding to the synthesis step.

7. The process according to claim 1, wherein a portion of the synthesis gas stream from the front-end section is subjected to said first cryogenic purification, and a remaining portion of said stream is directly subjected to said second purification, together with the purge stream extracted from the synthesis loop, said second purification comprising a process of cryogenic separation.

8. The process according to claim 7, wherein said second cryogenic purification comprises a low-pressure purification stage, carried out at a pressure higher than the minimum pressure among the incoming stream of the first purification, the outgoing stream of the first purification and the intake of a stage for compression of the synthesis gas, and said remaining portion of the stream is fed to said low-pressure purification stage.

9. The process according to claim 1, wherein a portion of said waste stream from the second purification step is recycled, being combined with the gas stream from the front-end section.

* * * * *